United States Patent
Pukki et al.

(10) Patent No.: US 9,712,009 B2
(45) Date of Patent: Jul. 18, 2017

(54) ROTOR AXLE OF A HIGH SPEED PERMANENT MAGNET MACHINE

(71) Applicant: SAIMAAN AMMATTIKORKEAKOULU OY, Lappeenranta (FI)

(72) Inventors: Timo Pukki, Lappeenranta (FI); Jussi Sopanen, Lemi (FI); Aki Lipponen, Lappeenranta (FI); Janne Nerg, Lappeenranta (FI); Juha Pyrhonen, Lappeenranta (FI)

(73) Assignees: LAPPEENRANNAN TEKNILLINEN YLIOPISTO, Lappeenranta (FI); SAIMAAN AMMATTIKORKEAKOULU OY, Lappeenranta (FI)

( * ) Notice: Subject to any disclaimer, the term of this patent is extended or adjusted under 35 U.S.C. 154(b) by 301 days.

(21) Appl. No.: 14/647,169

(22) PCT Filed: Nov. 25, 2013

(86) PCT No.: PCT/FI2013/051103
§ 371 (c)(1),
(2) Date: May 26, 2015

(87) PCT Pub. No.: WO2014/080087
PCT Pub. Date: May 30, 2014

(65) Prior Publication Data
US 2015/0318748 A1    Nov. 5, 2015

(30) Foreign Application Priority Data
Nov. 26, 2012   (FI) ...................... 20126241

(51) Int. Cl.
*H02K 1/28*  (2006.01)
*H02K 1/27*  (2006.01)
(Continued)

(52) U.S. Cl.
CPC ............ *H02K 1/28* (2013.01); *H02K 1/2706* (2013.01); *H02K 1/2733* (2013.01); *H02K 7/003* (2013.01);
(Continued)

(58) Field of Classification Search
CPC .... H02K 5/1672; H02K 1/2726; H02K 15/03; H02K 1/27; H02K 1/28; H02K 7/09;
(Continued)

(56) References Cited

U.S. PATENT DOCUMENTS 4,942,322 A  *  7/1990  Raybould ............ H02K 1/2726
                                                              29/598
6,047,461 A       4/2000  Miura et al.
(Continued)

FOREIGN PATENT DOCUMENTS

CN         102290893      12/2011
EP           0313310       4/1989
(Continued)

OTHER PUBLICATIONS

International Search Report for PCT/FI2013/051103, Completed by the Finnish Patent Office on Mar. 25, 2015, 6 Pages.
(Continued)

*Primary Examiner* — Mohamad Musleh
(74) *Attorney, Agent, or Firm* — Brooks Kushman P.C.

(57) ABSTRACT

A rotor axle of a high speed permanent magnet machine including a first part and a second part, both manufactured from a magnetically non-conducting material. The parts include an inner end and an outer end, and they can be axially interconnected one after the other by the inner ends to constitute an integral rotor axle. Their outer ends include bearing structures to fit the rotor axle with bearings. A cylindrical and solid permanent magnet is provided coaxially with the first part and the second part in between them and magnetized perpendicularly to the axial direction of the cylinder. The inner end of the first part of the rotor axle includes a cylindrical external surface with an external thread, the inner end of the second part includes a cylinder sleeve having an internal base part corresponding in shape to
(Continued)

the cylindrical permanent magnet to constitute a space for the permanent magnet.

17 Claims, 1 Drawing Sheet

(51) Int. Cl.
| | | |
|---|---|---|
| *H02K 7/08* | (2006.01) | |
| *H02K 9/06* | (2006.01) | |
| *H02K 7/09* | (2006.01) | |
| *H02K 7/00* | (2006.01) | |

(52) U.S. Cl.
CPC ............... *H02K 7/083* (2013.01); *H02K 7/09* (2013.01); *H02K 9/06* (2013.01)

(58) Field of Classification Search
CPC ...... H02K 1/2733; H02K 9/06; H02K 1/2706; H02K 7/083; H02K 7/003
See application file for complete search history.

(56) References Cited

U.S. PATENT DOCUMENTS

| | | |
|---|---|---|
| 2004/0051416 A1 | 3/2004 | Yamada et al. |
| 2005/0029885 A1 | 2/2005 | Shiao et al. |
| 2005/0134132 A1 | 6/2005 | Pruyn |
| 2011/0304234 A1 | 12/2011 | Ramon et al. |
| 2013/0062984 A1* | 3/2013 | Tremelling .......... H02K 1/2733 310/156.28 |
| 2014/0139065 A1* | 5/2014 | Yamada ................ H02K 21/16 310/156.66 |

FOREIGN PATENT DOCUMENTS

| | | |
|---|---|---|
| EP | 0418304 | 5/1993 |
| EP | 0956634 | 10/2005 |
| JP | H02123939 | 5/1990 |
| JP | 2009022096 | 1/2009 |
| KR | 20090014000 | 2/2009 |
| WO | 2014003563 | 1/2014 |

OTHER PUBLICATIONS

Search Report for Finnish Application No. FI 20126241, Dated Jun. 3, 2013, 1 Page.

Chinese Office Action for Chinese Application No. CN 201380071428.9, Completed by the Chinese Patent Office, Dated Jan. 24, 2017, 7 Pages.

Extended European Search Report for European Application No. EP 13857592.3, Completed by the European Patent Office, Dated Jun. 21, 2016, 6 Pages.

* cited by examiner

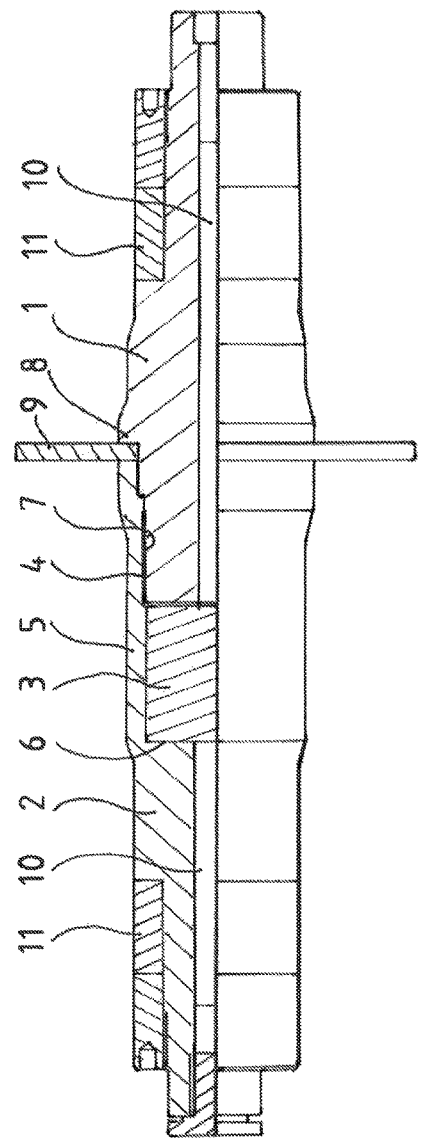

ROTOR AXLE OF A HIGH SPEED
PERMANENT MAGNET MACHINE

CROSS-REFERENCE TO RELATED
APPLICATION

This application is the U.S. national phase of PCT Application No. PCT/FI2013/051103 filed on Nov. 25, 2013, which claims priority to FI Patent Application No. 20126241 filed on Nov. 26, 2012, the disclosures of which are incorporated in their entirety by reference herein.

FIELD OF THE INVENTION

The invention relates to a rotor axle of a high speed permanent magnet machine according to the preamble of claim 1.

BACKGROUND OF THE INVENTION

The prior art in the field of the invention has been disclosed in patent publications EP 0418304 B1, EP 0956634 B1 and US 2004/0051416 A1. Known from the publications are rotors of high speed machines provided with permanent magnets which are efficient, but relatively fragile, consisting of rare earth metals. Due to the mechanical properties of the magnets, they are enclosed within a magnetically non-conducting tube or sleeve. The magnet may be fastened centrally in the sleeve with an interference fit, or it is also possible to manufacture the magnet directly inside the sleeve from a powder. Then, axle end pieces are generally fastened with an interference fit at both ends of the sleeve and welded together with the sleeve for greater securement.

The structures disclosed above work, but they encompass several disadvantages particularly in terms of manufacture. Due to many interference fits, it is difficult to assemble the structure, which requires special tools. The welding used for the structures makes them disposable, i.e. they cannot be disassembled without damaging the structures. In addition, it is impossible to modify them for different size classes due to the fixed structure. Furthermore, the setup of the assembly is problematic due to many successive interference fits. Further, it is difficult to fit the axles with bearings in the axial direction, which requires complex structures.

OBJECTIVE OF THE INVENTION

The objective of the invention is to remedy the above-mentioned defects of the prior art. Specifically, the objective of the invention is to disclose a novel rotor axle of a high speed permanent magnet machine with the smallest possible number of simple parts, able to be assembled and also disassembled in a simple and easy way, allowing simple implementation of the axial bearing and able to be easily modified for different size classes.

SUMMARY OF THE INVENTION

The rotor axle of a high speed permanent magnet machine according to the invention includes a first part and a second part, both manufactured from a magnetically non-conducting material. The first part and the second part both have an inner end and an outer end so that they can be axially interconnected one after the other by the inner ends to constitute an integral rotor axle. Their outer ends have bearing structures to fit the rotor axle with bearings for rotation. Further, a cylindrically shaped, solid permanent magnet is provided coaxially with the first part and the second part in between them and magnetized perpendicularly to the axial direction of the cylinder. According to the invention, a cylindrical external surface is provided at the inner end of the first part, i.e. towards the center of the rotor axle, and has an external thread. Correspondingly, a cylinder sleeve is provided at the inner end of the second part, i.e. towards the first part. The internal base part of the cylinder sleeve corresponds in shape to the cylindrical permanent magnet used so as to constitute a tight and substantially backlash-free space for the permanent magnet. Further, the outer edge of the internal lining of the cylinder sleeve has an internal thread corresponding to the external thread of the first part and allowing the first part and the second part to be concentrically and axially interconnected one after the other by the corresponding threads. This way, when the permanent magnet is provided in its space in the second part, and the first part and the second part are rotated together, it is pressed and locked in its space between the first part and the second part.

Preferably, the first part and the second part are made of the same magnetically non-conducting material which is suitably metal, such as steel, for example stainless steel. It is also possible to make them of titanium or a composite suitable for the purpose, including for example carbon fiber.

In one embodiment of the invention, the first part of the rotor axle includes a shoulder which is radial, i.e. perpendicular to the longitudinal direction of the axle, around the axle. A corresponding radial, straight and ring-shaped surface is also provided to the edge surface of the second part. This way, as the first part and the second part are joined by the corresponding threads, an annular space is formed between the peripheral edge of the cylinder sleeve of the second part and the shoulder. An annular disc can be placed in this annular space before joining the parts. When the thickness of the annular disc is suitably selected, it is tightly pressed in its place between the first part and the second part as they are rotated together.

Said annular disc may act as a plate transmitting the magnetic force of the axial bearing of the rotor axle. The disc may also have mainly radial formations, such as grooves, channels or the like, in which case it may act as a fan to provide an air flow cooling the different parts of the machine. It is also possible that the same annular disc acts as a plate transmitting the magnetic force of the axial bearing and as a fan at the same time.

In one embodiment of the invention, the first and the second part are hollow objects provided with a central hole. The hole extending through the second part allows inserting a tightly fitting permanent magnet in its position, while air is able to flow out through the hole. In the same way, it is possible to remove the magnet by pushing it through the hole. Further, the inner end of the central hole of the first part can be provided with a tightening screw which is rotated through the hole so as to press and tighten the magnet towards the base of the magnet space. This way, the magnet can be locked in its position.

In one embodiment of the invention, the rotor axle includes an alternative second part. Depending on the size of the magnet needed in an application, second parts of different lengths can be connected to the same first part of the axle, with the internal base part corresponding in shape to a cylindrical permanent magnet of an alternative size. This way, every part of the rotor axle need not be manufactured individually for each application, but the first part may be the same each time and only the second part be dimensioned according to the size and properties of the magnet as needed.

Advantages Provided by the Invention

The rotor axle according to the invention has considerable advantages over the prior art. The rotor axle of a high speed permanent magnet machine according to the invention can be manufactured from a smaller number of parts than the corresponding known structures. No separate support sleeves are required around the permanent magnet. The axle practically consists of only two parts interconnected by sufficiently long threads, so assembling of the axle is very simple and quick. No special tools are required to assemble the axle. Further, the structure allows implementation of a very simple plate transmitting the magnetic force of the axial bearing in the axle. In addition, the length of the active part of the rotor can be modified by changing only one of the parts of the axle.

BRIEF DESCRIPTION OF THE DRAWINGS

Below, the invention will be described in detail with reference to the accompanying drawing illustrating one rotor axle of a high speed permanent magnet machine according to the invention as a partial sectional view.

DETAILED DESCRIPTION OF THE INVENTION

The FIGURE illustrates one rotor axle of a high speed permanent magnet machine according to the invention consisting mainly of two concentric parts interconnected substantially one after the other, namely a first part 1 and a second part 2. The parts are cylindrical objects which are symmetrical relative to the central axis.

The inner end of the first part 1 includes an external thread 4, following which the external surface of the first part has a radial and annular circumferential surface, i.e. a shoulder 8. Then, the first part has the radial magnetic bearing structures 11 necessary for the axle. A central hole 10 opens at the outer end of the first part 1 and extends through the entire part.

The inner end of the second part 2 includes a cylinder sleeve 5 having a cylindrical base part 6 corresponding relatively accurately in shape to the shape of the cylindrical permanent magnet 3 used. This way, the permanent magnet can be tightly placed in this base part so as to be substantially backlash-free. Towards the inner end from the space required by the permanent magnet 3, the cylinder sleeve 5 in the second part includes an internal thread 7 corresponding to the external thread 4 of the inner end of the first part 1. This way, the first part 1 and the second part 2 can be rotated together one after the other by the corresponding threads to constitute a concentric structure. In addition, the outer end of the second part 2 has corresponding radial magnetic bearing structures 11 necessary for the axle and a hole 10 opening at the outer end and centrally extending through the second part up to the base part 6, i.e. to the magnet 3 therein.

The peripheral edge of the cylinder sleeve 5 of the second part 2 is a straight and planar annular surface, and a space is formed between it and the corresponding straight annular surface of the shoulder 8 for accommodating a ring-shaped disc 9. Its thickness is so adapted that it becomes firmly tightened in its position when the first part 1 and the second part 2 are screwed together.

In assembling the rotor axle, the magnet 3 can just be inserted into the second part 2 against the base part 6. Not even a tight fit should prevent the insertion of the magnet because air is able to flow out through the central hole 10 of the second part. In the same way, the magnet can be removed from its position as needed by pushing through the hole.

Normally, the permanent magnet is pressed in its space between the first part and the second part. However, should it be necessary to fix the magnet even more tightly, this can be accomplished through the central hole 10 of the first part for example by providing a thread in the inner part of the hole 10 close to the magnet 3. Through the hole, a suitable screw can be rotated on the thread so as to press the magnet and thus lock it in its position.

The invention has been described above by way of example with reference to the accompanying drawing; however, different embodiments of the invention are possible within the scope defined by the claims.

The invention claimed is:

1. A rotor axle of a high speed permanent magnet machine including a first part and a second part, both manufactured from a magnetically non-conducting material and including an inner end and an outer end for being axially interconnected one after the other by the inner ends to constitute an integral rotor axle, the outer ends including bearing structures to fit the rotor axle with bearings, and a cylindrical and solid permanent magnet which is coaxial with the first part and the second part in between them and magnetized perpendicularly to the axial direction of the cylinder, characterized in that the inner end of the first part of the rotor axle includes a cylindrical external surface with an external thread and that the inner end of the second part includes a cylinder sleeve, of which the internal base part corresponds in shape to the cylindrical permanent magnet so as to constitute a space for the permanent magnet, and of which the internal lining has an internal thread corresponding to the external thread of the first part, so that when the first part and the second part are concentrically rotated together one after the other in the axial direction, the permanent magnet is provided in its space between the parts.

2. The rotor axle according to claim 1, wherein the first part and the second part are made of metal, such as steel, for example stainless steel.

3. The rotor axle according to claim 1, wherein the first part and the second part are made of titanium.

4. The rotor axle according to claim 1, wherein the first part and the second part are made of a composite suitable for the purpose.

5. The rotor axle according to claim 1, wherein the bearing structures include conical surfaces acting as bearing surfaces in axial and radial bearings.

6. The rotor axle according to claim 1, wherein the first part includes a radial shoulder, whereby an annular space is provided between it and the peripheral edge of the cylinder sleeve of the second part, in which space an annular disc can be placed and pressed in its position between the parts by rotating the first part and the second part together.

7. The rotor axle according to claim 6, wherein the annular disc is a plate transmitting the magnetic force of the axial bearing, a fan or a combination thereof.

8. The rotor axle according to claim 6, wherein the surface of the annular disc includes substantially radial grooves or channels to provide cooling air flows.

9. The rotor axle according to claim 1, wherein the first part and the second part are hollow objects provided with a central hole.

10. The rotor axle according to claim 1, wherein the rotor axle includes an alternative second part, wherein the internal base part corresponds in shape to a cylindrical permanent magnet of an alternative size so as to constitute a space for the alternative permanent magnet.

11. The rotor axle according to claim 2, wherein the bearing structures include conical surfaces acting as bearing surfaces in axial and radial bearings.

12. The rotor axle according to claim 3, wherein the bearing structures include conical surfaces acting as bearing surfaces in axial and radial bearings.

13. The rotor axle according to claim 4, wherein the bearing structures include conical surfaces acting as bearing surfaces in axial and radial bearings.

14. The rotor axle according to claim 2, wherein the first part includes a radial shoulder, whereby an annular space is provided between it and the peripheral edge of the cylinder sleeve of the second part, in which space an annular disc can be placed and pressed in its position between the parts by rotating the first part and the second part together.

15. The rotor axle according to claim 3, wherein the first part includes a radial shoulder, whereby an annular space is provided between it and the peripheral edge of the cylinder sleeve of the second part, in which space an annular disc can be placed and pressed in its position between the parts by rotating the first part and the second part together.

16. The rotor axle according to claim 4, wherein the first part includes a radial shoulder, whereby an annular space is provided between it and the peripheral edge of the cylinder sleeve of the second part, in which space an annular disc can be placed and pressed in its position between the parts by rotating the first part and the second part together.

17. The rotor axle according to claim 7, wherein the surface of the annular disc includes substantially radial grooves or channels to provide cooling air flows.

* * * * *